United States Patent
Ryu

(10) Patent No.: US 11,126,578 B2
(45) Date of Patent: Sep. 21, 2021

(54) MOBILE BROADBAND INTERFACE MODEL (MBIM) WITH TIMEOUT MECHANISM

(71) Applicant: Intel Corporation, Santa Clara, CA (US)

(72) Inventor: Yong Nam Ryu, Gunposi (KR)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 15/845,749

(22) Filed: Dec. 18, 2017

(65) Prior Publication Data

US 2019/0042502 A1 Feb. 7, 2019

(51) Int. Cl.
*G06F 13/362* (2006.01)
*G06F 13/42* (2006.01)
*H04W 88/02* (2009.01)

(52) U.S. Cl.
CPC ...... *G06F 13/3625* (2013.01); *G06F 13/4282* (2013.01); *H04W 88/02* (2013.01)

(58) Field of Classification Search
CPC ............ G06F 13/3625; G06F 13/4282; H04W 88/02; Y02D 10/00
See application file for complete search history.

(56) References Cited

U.S. PATENT DOCUMENTS

| | | | | |
|---|---|---|---|---|
| 5,787,363 | A * | 7/1998 | Scott | H04L 5/1438 455/557 |
| 10,420,022 | B1 * | 9/2019 | Govindassamy | H04W 52/0216 |
| 2008/0123283 | A1 * | 5/2008 | Mellage | H04B 1/3816 361/679.44 |
| 2009/0276549 | A1 * | 11/2009 | Zechlin | G06F 13/385 710/36 |
| 2010/0081435 | A1 * | 4/2010 | Huang | H04W 60/00 455/435.1 |
| 2011/0207465 | A1 * | 8/2011 | Dwyer | H04W 72/02 455/450 |
| 2012/0069823 | A1 * | 3/2012 | Low | H04W 4/00 370/335 |
| 2014/0250165 | A1 * | 9/2014 | Duda | H04L 67/145 709/203 |
| 2015/0208463 | A1 * | 7/2015 | Yang | H04W 76/30 370/329 |
| 2015/0355989 | A1 * | 12/2015 | Hayden | G06F 11/0793 714/56 |
| 2018/0095926 | A1 * | 4/2018 | Srinivasan | G06F 13/4068 |

OTHER PUBLICATIONS

USB Implementers Forum, Inc.; "Universal Serial Bus Communications Class Subclass Specification for Mobile Broadband Interface Model," Revision 1.0, Errata—1, May 1, 2013, 231 pages.

* cited by examiner

*Primary Examiner* — Farley Abad
(74) *Attorney, Agent, or Firm* — Schwabe, Williamson & Wyatt, P.C.

(57) ABSTRACT

Embodiments of the present disclosure are directed toward identifying an indication of a timeout related to a mobile broadband interface model (MBIM) process. The disclosure may also be directed to transmitting, based on the indication of the timeout, an indication of an abort command, wherein the abort command is to provide direction to abort the MBIM process. Other embodiments may be described and/or claimed.

22 Claims, 5 Drawing Sheets

MOBILE BROADBAND INTERFACE MODEL (MBIM) WITH TIMEOUT MECHANISM

FIELD

Embodiments of the present disclosure generally relate to the field of peripheral devices, and more specifically to devices coupled with a host via a universal serial bus (USB) connection.

BACKGROUND

Mobile Broadband Interface Model (MBIM) may be used for a communication between a host device and cellular modem devices for various wireless modem activities. For example, MBIM may be used with M.2, machine-to-machine (M2M), or internet-of-things (TOT) devices to allow the host device to communicate with a radio access network (RAN) via a universal serial bus (USB)-attached MBIM-enabled modem.

In some scenarios, an MBIM process such as the modem detach procedure whereby the MBIM-enabled modem communicatively separates from the RAN may take a non-negligible amount of time. For example, in some situations the MBIM process may be measured on the order of minutes. This non-negligible amount of time may be due to pre-existing timers at various protocol layers, a lack of response at or from the cellular modem, or some other cause. This non-negligible amount of time for the MBIM process may result in decreased user performance (e.g., the user may view the situation as an undesirable dead lock situation) or a waste of central processing unit (CPU) power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
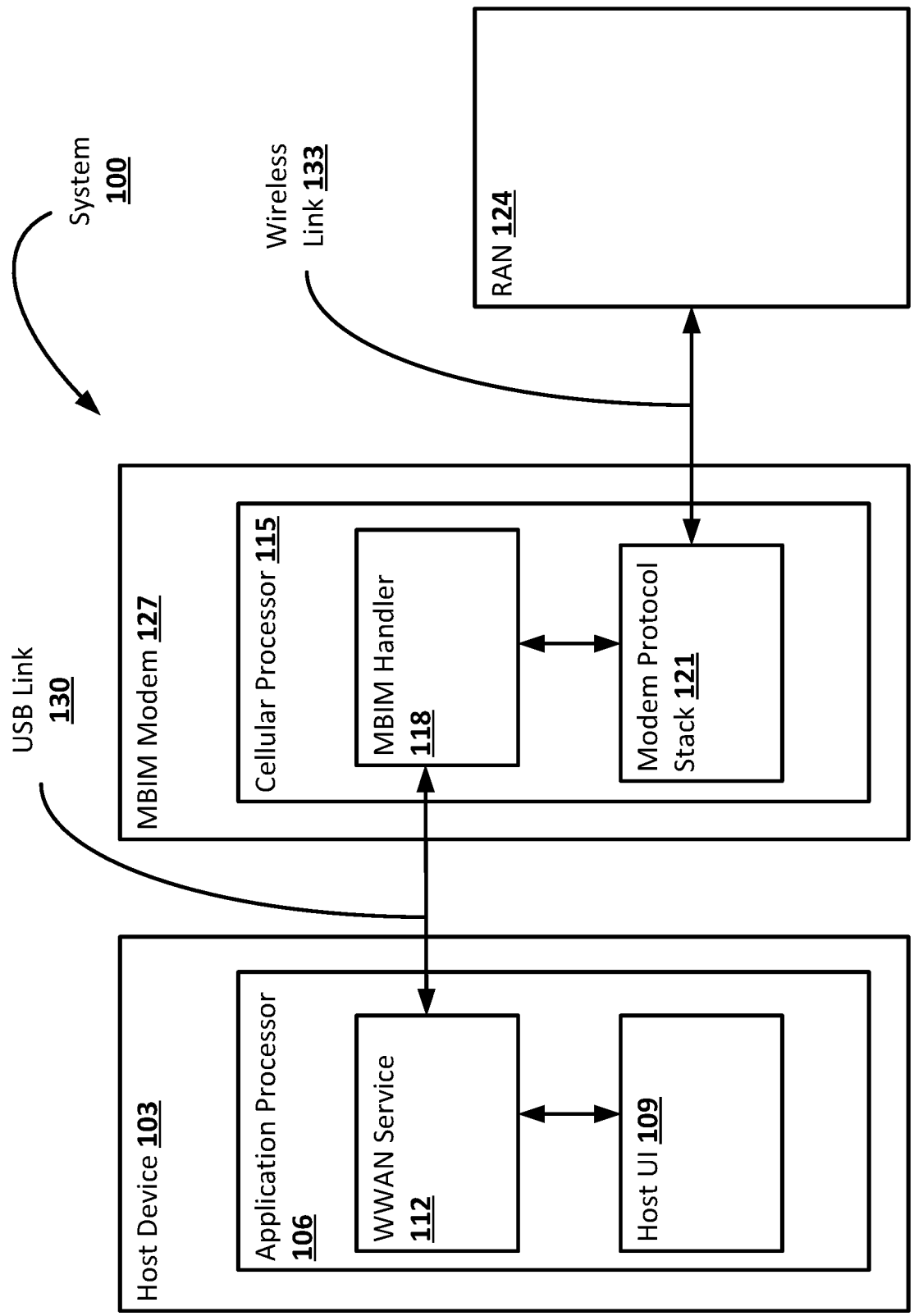
FIG. 1 illustrates an example system that includes a host device, an MBIM-enabled modem, and a RAN, in accordance with various embodiments.

Embodiments of the present disclosure are directed to a timeout/timer mechanism and an abort command that may be used with MBIM processes. Other embodiments may be described and/or claimed.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts an example system 100 that may include a host device 103 and an MBIM modem 127. The host device 103 may be, for example, an IOT device, an M.2 device, a M2M device, or some other type of device. For example, in some embodiments the host device 103 may be a wearable device, a user equipment (UE), a laptop computer, a cell phone, a desktop computer, a personal digital assistant (PDA), an external memory such as an external solid state drive (SSD), or some other type of computing device that may wish to communicate with a RAN such as RAN 124 via the MBIM modem 127.

The host device 103 and the MBIM modem 127 may be communicatively coupled with one another via a USB link 130. The USB link 130 may also allow MBIM communication between the host device 103 and the MBIM modem 127. For example, the USB link 130 may allow for USB and MBIM communication between the host device 103 and the MBIM modem 127 and may at least partially be in accordance with the "Universal Serial Bus Communications Class Subclass Specification for Mobile Broadband Interface Model," revision 1.0 Errata—1, published May 1, 2013 by the USB Implementers Forum, Inc. ("the MBIM specification").

The MBIM modem 127 may then be configured to communicate with RAN 124 via wireless link 133. Specifically, the MBIM modem 127 may have one or more antennas (not shown for clarity) that are configured to send or receive one or more wireless signals to a NodeB (e.g., an enhanced NodeB (eNB), a fifth generation (5G) NodeB, a new radio (NR) NodeB, etc.) of the RAN 124 (not shown for clarity). The wireless link 133—and, correspondingly, RAN 124—may be in accordance with, for example, current, past, or future releases of the third generation partnership project (3GPP) long-term evolution (LTE) or LTE-advanced (LTE-A) specifications, or some other wireless specification.

In embodiments, the host device 103 may include one or more processors including an application processor 106. The application processor 106 may be implemented as one or more application processors. For example, the application processor 106 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the host device 103. In some embodiments, processors of application processor 106 may process IP data packets received from RAN 124.

The application processor 106 may include a wireless wide area network (WWAN) service module 112 and a host user interface (UI) module 109. Specifically, the application processor 106 may implement the host UI module 109 or the WWAN service module 112 as dedicated hardware circuitry, hardware, software, firmware, or some combination thereof. In embodiments where the application processor 106 is composed of a plurality of processors (or a multi-core processor), the host UI module 109 or the WWAN service module 112 may be implemented across a plurality of processors or cores.

In embodiments, the host UI module 109 may be communicatively coupled with one or more input elements of the host device 103. For example, the host UI module 109 may be communicatively coupled with an input element such as a mouse, a keyboard, a touchscreen, an audio input device (i.e., a microphone or a speech-to-text module) or some other type of input element that is capable of receiving a command or information from one or more users of the host device 103. Additionally or alternatively, the host UI module 109 may be communicatively coupled with one or more output elements such as a graphical UI (GUI) module, a display screen (which may be the same as or separate from the touch screen), a speaker, a haptic feedback module, or some other type of output element that is capable of providing information to one or more users of the host device 103.

The WWAN service module 112 may be a module that is communicatively coupled with the host UI module 109. That is, the WWAN service module 112 may be able to send or receive information, directly or indirectly, from the host UI module 109. Generally, the WWAN service module 112 may provide to upper layers for services/functions of WWAN services by using various technologies like MBIM. More generally, the WWAN service module 112 may be configured to generate one or more MBIM signals for transmission over USB link 130. That is, the WWAN service module 112 may be configured to receive information from the host UI module 109, or some other module, element, or component of the application processor 106 or host device 103, and translate it to one or more MBIM signals in accordance with the MBIM specification. The WWAN service module 112 may then be configured to transmit or facilitate the transmission of the one or more MBIM signals across the USB link 130. Similarly, the WWAN service module 112 may identify, receive, or facilitate the identification or reception of one or more MBIM signals via the USB link 130 and translate the one or more MBIM signals into information or commands that are then transmitted to the host UI module 109 or other elements or components of the application processor 106 or host device 103.

The MBIM modem 127 may include a cellular processor 115. In embodiments the cellular processor 115 may be, for example, a baseband processor or some other type of processor. The cellular processor 115 may include circuitry such as, but not limited to, one or more single-core or multi-core processors. The cellular processor 115 may include one or more baseband processors or control logic to process baseband signals received from a receive signal path of radio frequency (RF) circuitry of the MBIM modem 127 (not shown for clarity) and to generate baseband signals for a transmit signal path of the RF circuitry. Cellular processor 115 may be configured for generation and processing of the baseband signals and for controlling operations of the RF circuitry. For example, in some embodiments, the cellular processor 115 may include a third generation (3G) baseband processor, a fourth generation (4G) baseband processor, a fifth generation (5G) baseband processor, or other baseband processor(s) for other existing generations, generations in development or to be developed in the future (e.g., second generation (2G), sixth generation (6G), etc.). The baseband circuitry may handle various radio control functions that enable communication with one or more radio networks via the RF circuitry. In other embodiments, some or all of the functionality of baseband processors may be included in modules stored in the memory and executed via a Central Processing Unit (CPU) of the cellular processor 115 or coupled with the cellular processor 115. The radio control functions may include, but are not limited to, signal modulation/demodulation, encoding/decoding, radio frequency shifting, etc. In some embodiments, modulation/demodulation circuitry of the cellular processor 115 may include Fast-Fourier Transform (FFT), precoding, or constellation mapping/demapping functionality. In some embodiments, encoding/decoding circuitry of the cellular processor 115 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. In some embodiments, the modulation/demodulation and encoder/decoder functionality may be performed or facilitated by modem protocol stack circuitry 121 of the cellular processor 115. The modem protocol stack circuitry 121 may be implemented as hardware, software, firmware, or some combination thereof. Specifically, the modem protocol stack circuitry 121 may be implemented by, an element of, or coupled with the CPU of the cellular processor 115 described above.

In some embodiments, the cellular processor 115 may include one or more audio digital signal processor(s) (DSP). The audio DSP(s) may include elements for compression/decompression and echo cancellation and may further include additional/alternative suitable processing elements in other embodiments. Components of the cellular processor 115 may be suitably combined in a single chip, a single chipset, or disposed on a same circuit board in some embodiments. In some embodiments, some or all of the constituent components of the cellular processor 115 may be implemented together such as, for example, on a system on a chip (SOC).

In some embodiments, the cellular processor 115, and particularly the modem protocol stack 121, may provide for communication compatible with one or more radio technologies. For example, in some embodiments, the cellular processor 115 may support communication with an evolved universal terrestrial radio access network (EUTRAN) or other wireless metropolitan area networks (WMAN), a wireless local area network (WLAN), a wireless personal area network (WPAN). Embodiments in which the cellular processor 115 is configured to support radio communications of more than one wireless protocol may be referred to as multi-mode baseband circuitry.

In embodiments, the cellular processor 115 may further include MBIM handler circuitry 118 that is communicatively coupled with the modem protocol stack circuitry 121. The MBIM handler circuitry 118 may, similarly to the WWAN service module 112, be configured to perform one or more functions related to MBIM communications between the host device 103 and the MBIM modem 127. More generally, the MBIM handler circuitry 118 (similarly to the WWAN service module 112) may be configured to generate one or more MBIM signals for transmission over USB link 130. That is, the MBIM handler circuitry 118 may be configured to receive information from the modem protocol stack 121, or some other module, element, or component of the cellular processor 115 or MBIM modem 127, and translate it to one or more MBIM signals in accordance with the MBIM specification. The MBIM handler circuitry 118 may then be configured to transmit or facilitate the transmission of the one or more MBIM signals across the USB link 130. Similarly, the MBIM handler circuitry 118 may identify, receive, or facilitate the identification or reception of one or more MBIM signals via the USB link 130 and translate the one or more MBIM signals into information or commands that are then transmitted to the modem protocol stack 121 or other elements or components of the cellular processor 115 or MBIM modem 127.

It will be understood that FIG. 1 is a simplified figure, and several elements or layers may have been omitted from the host device 103 and the MBIM modem 127. These elements may have been omitted for the sake of clarity and elimination of redundancy, but may still exist. For example, one or more additional physical elements may be between the WWAN service module 112 and the MBIM handler circuitry 118; however, they may not be necessary for the sake of description of embodiments herein.

Figure 2:
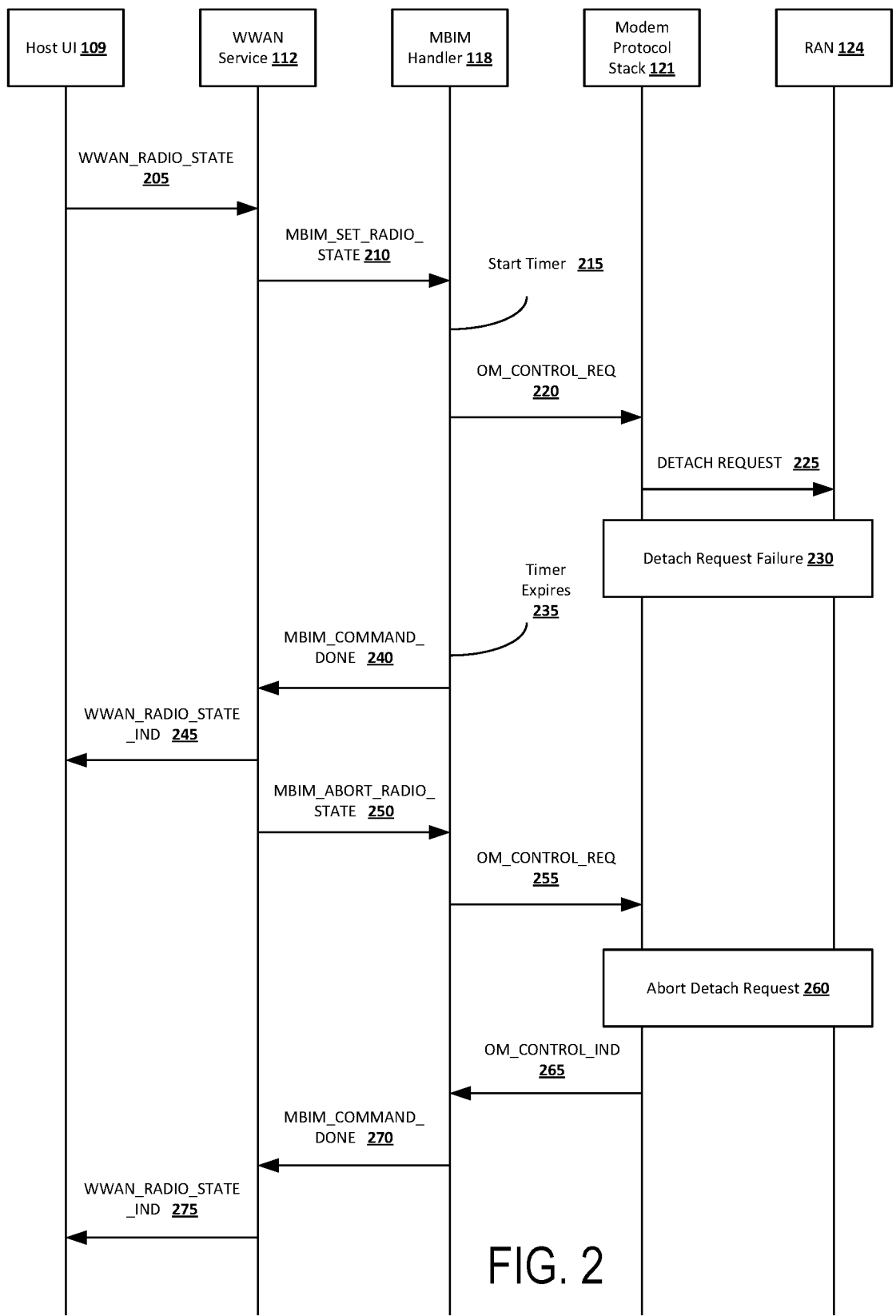
FIG. 2 illustrates an example process flow that may be performed by one or more elements of the system of FIG. 1, in accordance with various embodiments.

FIG. 2 depicts an example process flow that may be performed by the system 100. Specifically, the process flow may be performed by the host UI module 109, the WWAN service module 112, the MBIM handler circuitry 118, and the modem protocol stack 121. One or more elements of the process may further be performed by the RAN 124. One embodiment of the process will be described herein with respect to specific signals or message names; however, it will be understood that in other embodiments the signals may be named differently or may include additional information or signals to those named here. For example, WWAN_RADIO_STATE message as described at 205 may be described to include a WwanRadioOff command (as will be described in greater detail below); however, in other embodiments the message at 205 may be named differently, or the command may be named differently. Additionally or alternatively, the WWAN_RADIO_STATE message as described at 205 may include additional or alternative commands.

Generally, embodiments of the process herein will be described with respect to a specific MBIM process, a detach request. However, it will be understood that the detach request is merely one example of an MBIM process that may benefit from the timer/timeout mechanism or the abort command as described herein. Other MBIM processes that may benefit from the timer/timeout mechanism or the abort command may include, for example, an attach request, initiating a mobile-originated (MO) voice call, terminating a voice call, sending information such as a short message service (SMS) message, activation of packet data protocol (PDP) context, or some other MBIM process. More generally, MBIM processes that include a process that could "hang" or otherwise cause a delay due to the uncompleted process may benefit from the timer/timeout mechanism and the MBIM abort command described herein. Specific statements may be made below to describe other situations where different commands may not be strictly related to a detach request, but those examples are intended as illustrative rather than comprehensive. In other words, it should not be assumed that omission of a specific alternative example below indicates that such an alternative may not exist in other embodiments.

The process may begin with transmission at 205 of a WWAN_RADIO_STATE message from host UI module 109 to WWAN service module 112. The WWAN_RADIO_STATE message at 205 may include a WwanRadioOff command that is intended to instruct the MBIM modem 127 to initiate a detach procedure to communicatively decouple from the RAN 124. In embodiments, the WWAN_RADIO_STATE message at 205 may be the result of a user action such as placing the host device 103 in airplane mode. In other embodiments, the WWAN_RADIO_STATE message at 205 may be the result of a non-user action such as an application running on the host device 103 or some other procedure that could result in voluntarily decoupling from the RAN 124.

Responsive to the message at 205, the WWAN service module 112 may then transmit an MBIM_SET_RADIO_STATE message to the MBIM handler circuitry 118 at 210. The MBIM_SET_RADIO_STATE message at 210 may be transmitted, for example, via a USB link such as USB link 130. The MBIM_SET_RADIO_STATE message at 210 may include, for example, an MBIMRadioOff command. The MBIMRadioOff command may be a command in accordance with MBIM protocols that is to instruct the MBIM handler circuitry 118, and more generally the MBIM modem 127 or the cellular processor 115, to communicatively detach from RAN 124. For example, the MBIM modem 127 may communicatively detach from RAN 124 by initiating a detach procedure prior to or in conjunction with putting the MBIM modem 127 in a low (or zero) power state such as a discontinuous reception (DRX) state or some other state. The MBIM_SET_RADIO_STATE message at 210 may further include a MaxWaitTime command that may include an indication of a time value. The time value may be on the order of minutes, second, nanoseconds, microseconds, or some other unit of time.

Subsequently to receiving the MBIM_SET_RADIO_STATE message at 210, the MBIM handler circuitry 118 may initiate a timer at 215 based on the MaxWaitTime command in the MBIM_SET_RADIO_STATE message received at 210. In embodiments, the timer at 215 may be based wholly or partially on the value provided by the MaxWaitTime command. For example, the value of the timer at 215 may be identical to the value indicated by the MaxWaitTime command, while in other embodiments the value of the timer at 215 may be based on the value indicated by the MaxWaitTime command (e.g., a multiple or fraction thereof, or some other value related to the MaxWaitTime command).

The MBIM handler circuitry 118 may then transmit an OM_CONTROL_REQ message to the modem protocol stack circuitry 121 at 220. The OM_CONTROL_REQ message may include an OM_MODE_AIRPLANE command that may instruct the modem protocol stack circuitry 121 to enter airplane mode. As used herein, "airplane mode" may refer to a mode wherein wireless communications such as WiFi, cellular communications, short range communications such as Bluetooth, etc. are discontinued. In some embodiments, discontinuance of the wireless communications may be based on the MBIM modem 127 entering a low or zero power state, the MBIM modem 127 may maintain its current power state but cease transmission of wireless signals, or some other mode that results in the discontinuance of the wireless communications.

Based on the transmission at 220, the modem protocol stack circuitry 121 may transmit a detach request to the RAN 124 at 225. The detach request at 225 may include, for example, instructions or notifications to one or more elements of the RAN 124 that the MBIM modem 127 is to detach from the RAN 124. More generally, the detach request at 225 may include an indication that the RAN 124 and the MBIM modem 127 are to initiate the detach process (or, in other embodiments, some other MBIM process). As used herein, "detach" may refer to the MBIM modem 127 communicatively decoupling, either permanently or temporarily, from the RAN 124. The decoupling may be complete or partial (i.e., a reduction in information signals but still maintaining periodic paging).

A detach request failure may then occur at 230. The detach request failure may occur, for example, at the RAN 124, at the MBIM modem 127, or at both. For example, the detach request failure may be based on a miscommunication between the MBIM modem 127 and the RAN 124 such as a protocol error, a timeout due to poor radio link quality, a fatal error at the MBIM modem 127, etc. As such, the MBIM modem 127 and the RAN 124 may not be able to complete the detach procedure.

In legacy networks, as described above, there may have been no indication that the detach request failure 230 occurred. As such, the MBIM modem 127 may have continued to attempt the detach request procedure or await a response from the RAN 124. As such, the detach request procedure could take a non-negligible amount of time as described above. However, in embodiments herein, the timer that had begun at 215 based on the MaxWaitTime command in the MBIM_SET_RADIO_STATE transmission at 210 may then expire at 235.

Based on the expiration of the timer at 235, the MBIM handler circuitry 118 may transmit an MBIM_COMMAND_DONE message to the WWAN service module 112 at 240. The MBIM_COMMAND_DONE message may include, for example, an indication of a ResponseTimeout in an MBIM_STATUS_CODES command. The ResponseTimeout may indicate, for example, that the timer expired at 235 without successful resolution of the detach request at 225. Again, it will be understood that this is merely one specific example for the purpose of illustration, and in other embodiments/processes the ResponseTimeout message may be related to a different MBIM process than the detach request described herein.

Based on the MBIM_COMMAND_DONE message at 240, the WWAN service module 112 may transmit a WWAN_RADIO_STATE_IND message at 245 to the host UI module 109. The WWAN_RADIO_STATE_IND message may include, for example, a ResponseTimeout command that may indicate, for example, that the timer expired at 235 without successful resolution of the detach request (or some other MBIM process in other embodiments) at 225. In some embodiments (not shown), the host UI module 109 may then provide, or facilitate provision of, some indication of the failure of the detach request to the user. For example, the host UI module 109 may provide an audio, visual, or some other message to a user to show that the MBIM modem 127 was unable to enter airplane mode.

Based on the MBIM_COMMAND_DONE message at 240, the WWAN service module 112 may also transmit an MBIM_ABORT_RADIO_STATE message to the MBIM handler circuitry 118 at 250. As shown in FIG. 2, element 250 may occur after element 245. However, in other embodiments element 250 may occur before or in parallel with element 245. The MBIM_ABORT_RADIO_STATE message at 250 may indicate to the MBIM handler circuitry 118 that the MBIM modem 127 is to abort an attempted change in its radio state, for example, entering airplane mode.

Based on the MBIM_ABORT_RADIO_STATE message at 250, the MBIM handler circuitry 118 may transmit an OM_CONTROL_REQ message at 255 to the modem protocol stack circuitry 121. The OM_CONTROL_REQ message at 255 may include, for example, an ABORT command. The ABORT command may instruct, for example, the modem protocol stack circuitry 121 to abort all ongoing procedures, including the detach request initiated at 225.

Based on the OM_CONTROL_REQ message at 255, the modem protocol stack circuitry 121 and the RAN 124 may abort the detach request procedure (or, in other embodiments, a different MBIM process) at 260. Aborting the detach request procedure may include, for example, not re-sending an indication of the detach request, not responding to a message received from the RAN 124, transmission of an affirmative indication that the RAN 124 is to cease processing the detach request, some other action to abort the detach request, or a combination thereof.

Subsequent to aborting the detach request at 260, the modem protocol stack circuitry 121 may transmit an OM_CONTROL_IND message at 265 to the MBIM handler circuitry 118. The OM_CONTROL_IND message at 265 may include, for example, an ABORT command that may indicate that all ongoing activities between the modem protocol stack 121 and the RAN 124, including the detach request, have been aborted.

Based on the OM_CONTROL_IND message at 265, the MBIM handler circuitry 118 may transmit an MBIM_COMMAND_DONE message at 270 to the WWAN service module 112. The MBIM_COMMAND_DONE message may include, for example, an indication of an AbortResult in an MBIM_STATUS_CODES command. The AbortResult may indicate, for example, from the MBIM modem 127 to the host device 103, a result of the abort procedure at 260. For example, the AbortResult may indicate whether the abort procedure was successful.

Based on the MBIM_COMMAND_DONE message at 270, the WWAN service module 112 may transmit a WWAN_RADIO_STATE_IND message 275 to the host UI module 109. The WWAN_RADIO_STATE_IND message may include, for example, an AbortResult command that may further convey a result of the abort procedure at 260. For example, the AbortResult command may indicate whether the abort procedure was successful. The host UI module 109 may then provide some indication to a user of the host device 103, e.g., an audio or visual indication, that the abort procedure was successful.

Based on the procedure above, it may be seen that embodiments herein may provide two advantages over legacy MBIM processes. First, embodiments herein may provide an indication of a timer that can be used (e.g., between elements 215 and 235) to set a specific time in which the MBIM process should be completed. Due to the timer, if a problem occurs with the MBIM process then the system may be able to resolve the difficulty in a timely fashion, rather than causing a non-negligible delay. This resolution may increase the user experience and decrease power inefficiencies. Additionally, embodiments herein may provide for a specific "abort" command related to the MBIM process which may allow for a problematic MBIM process to be aborted. Again, in this way embodiments herein may reduce the time that a problematic MBIM process may consume, thereby increasing user experience and decreasing power inefficiencies.

In order to realize embodiments herein, and more specifically the process flow described above with respect to FIG. 2, various changes to the MBIM specification may be desirable. Specifically, Table 9-6 (below) depicts example updates to Table 9-6 of the MBIM specification. Again, it will be understood that these are intended as examples and other embodiments may use different specific names or data types to convey the same message. Updates to the table are shown in underlined italics.

TABLE 9-6

MBIM_COMMAND_MSG Message

| Offset | Size | Field | Type | Description |
|---|---|---|---|---|
| 0 | 12 | MessageHeader | MBIM_MESSAGE_HEADER | A message header as specified in Table 9-1 MBIM_MESSAGE_HEADER |
| 12 | 8 | FragmentHeader | MBIM_FRAGMENT_HEADER | A fragmentation header as specified in Table 9-2: MBIM_FRAGMENT_HEADER |
| 20 | 16 | DeviceServiceId | UUID | A 16-byte UUID that identifies the device service the following CID value applies. |
| 36 | 4 | CID | UINT32 | Specifies the CID that identifies the parameter being queried for. |
| 40 | 4 | CommandType | UINT32 | 0 for a query operation, 1 for a Set operation, *2 for an Abort operation*. |
| 44 | 4 | InformationBufferLength | UINT32 | Size of the TotalInformationBuffer, may be larger than current message if fragmented. *For the set command, MaxWaitTime may be provided here*. |
| 48 | | InformationBuffer | DATABUFFER | Data supplied to device specific to the CID. *For the set command, MaxWaitTime may be provided here*. |

Generally, as shown above, there may be two notable changes to Table 9-6. Specifically, a new command type "Abort" is introduced. As shown above, the "Abort" command may be indicated by including a value of "2" in a field of an MBIM_COMMAND_MSG message. The "Abort" command described herein may be used, for example, as part of the transmission of the MBIM_ABORT_RADIO_STATE message at element 250. Additionally, the MaxWaitTime is introduced for the "set" command. As described above, MaxWaitTime may be a command element of a message such as the MBIM_SET_RADIO_STATE message transmitted at 210.

In embodiments, another change to the MBIM specification may be desirable. Specifically, Table 9-15 (below) depicts example updates to Table 9-15 of the MBIM specification. Again, it will be understood that these are intended as examples and other embodiments may use different specific names or data types to convey the same message. Updates to the table are shown in underlined italics.

TABLE 9-15

MBIM_STATUS CODES

| Name | Value | Description |
|---|---|---|
| MBIM_STATUS_SUCCESS | 0 | The operation succeeded. |
| ... | ... | ... |
| MBIM_STATUS_STK_BUSY | 27 | The SIM Toolkit application on the SIM card is busy and the command could not be processed. |

TABLE 9-15-continued

MBIM_STATUS CODES

| Name | Value | Description |
|---|---|---|
| MBIM_STATUS_OPERATION_NOT_ALLOWED | 28 | The operation failed because the operation is not allowed. |
| *MBIM_STATUS_OPERATION_TIMEOUT* | *29* | *The operation failed because the allowed operation time gets exceeded.* |
| *MBIM_STATUS_ABORT_FAILURE* | *30* | *The abort operation failed.* |

Generally, as shown above, there may be two notable changes to Table 9-15. The first may be the introduction of the MBIM_STATUS_OPERATION_TIMEOUT field and the second may be the introduction of the MBIM_STATUS_ABORT_FAILURE field. The MBIM_STATUS_OPERATION_TIMEOUT field may be, for example, the ResponseTimeout indication at element 240 and may be used to indicate the detach request failure at 230 and the expiration of the timer at 235. The MBIM_STATUS_ABORT_FAILURE field may be, for example, the AbortResult indication at element 270 and may be used to indicate from the MBIM modem 127 to the host device 103 that the abort procedure at 260 failed.

Figure 3:
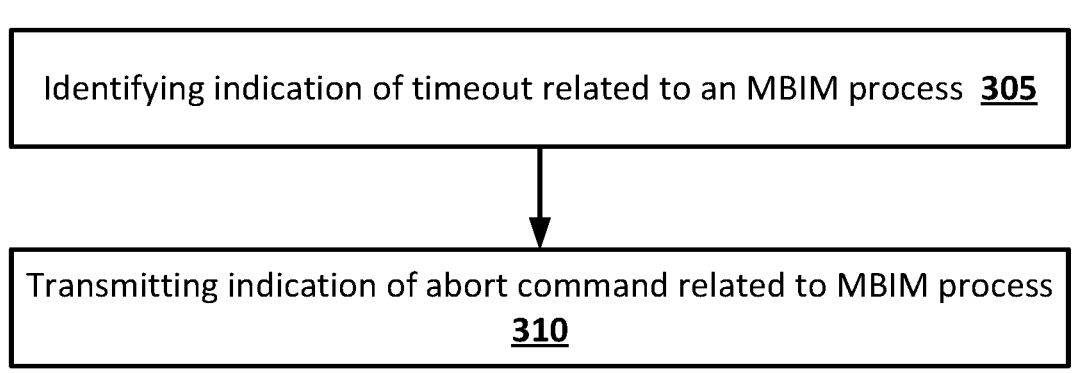
FIG. 3 illustrates an example process flow that may be performed by a host device, in accordance with various embodiments.

FIG. 3 depicts an example simplified process that may be performed, for example, by an application processor such as application processor 106. The process may include identifying, at 305, an indication of a timeout related to an MBIM process. Element 305 may be performed, for example, by WWAN service module 112 and may correspond, for example, to element 240 of FIG. 2. The indication of the timeout may correspond, generally, to the ResponseTimeout indication in the MBIM_STATUS_CODES command of the MBIM_COMMAND_DONE message.

The process may then include transmitting, at 310, an indication of an abort command related to the MBIM process. Element 310 may be performed, for example, by WWAN service module 112 and may generally correspond, for example, to element 250 of FIG. 2. The indication of the abort command may correspond, generally, to the MBIM_ABORT_RADIO_STATE message transmitted at element 250.

Figure 4:
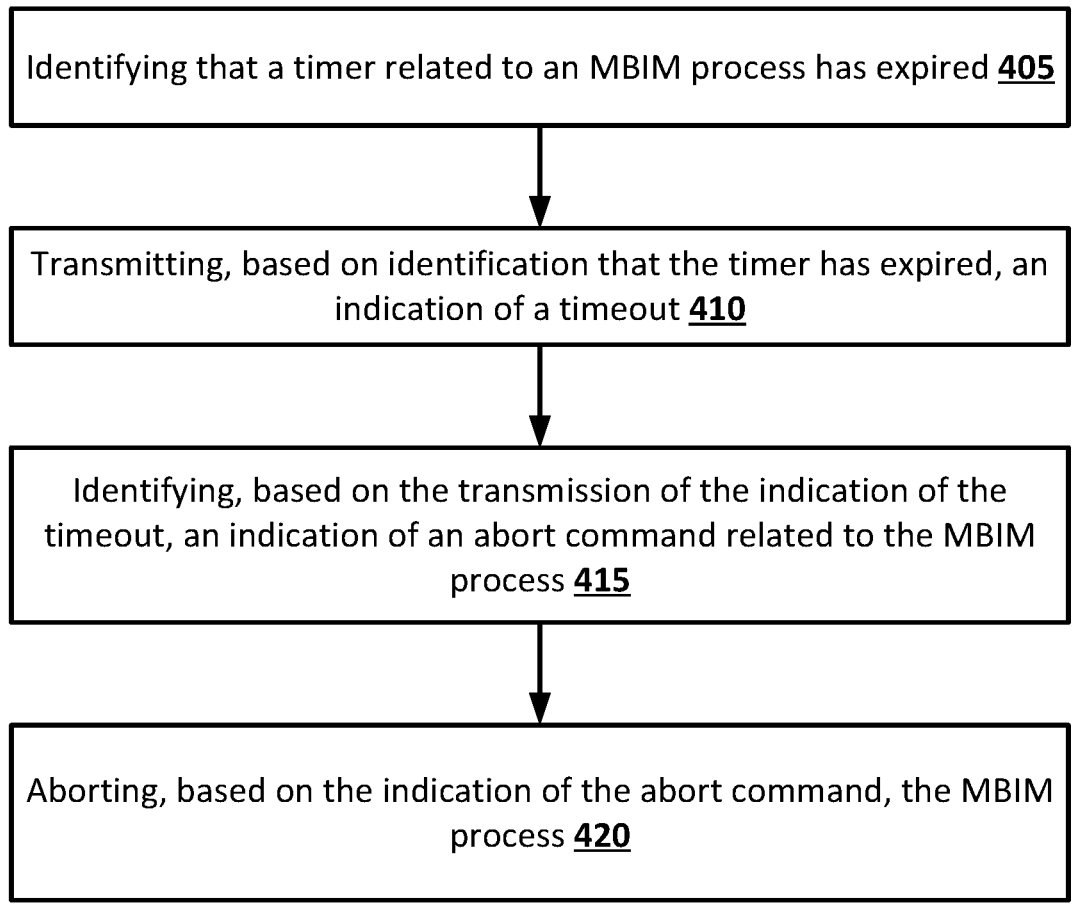
FIG. 4 illustrates an example process flow that may be performed by an MBIM-enabled modem, in accordance with various embodiments.

FIG. 4 depicts an example simplified process that may be performed, for example, by an MBIM modem and, more specifically, by a cellular processor such as cellular processor 115. The process may include identifying, at 405, that a timer related to an MBIM process has expired. Element 405 may be performed, for example, by MBIM handler circuitry 118 and may correspond, for example, to element 235 of FIG. 2.

The process may then include transmitting, at 410 and based on identification that the timer has expired, an indication of a timeout. Element 410 may be performed, for example, by MBIM handler circuitry 118 and may correspond, for example, to element 240 of FIG. 2. The indication of the timeout may correspond, generally, to the ResponseTimeout indication in the MBIM_STATUS_CODES command of the MBIM_COMMAND_DONE message.

The process may then include identifying, at 415 and based on the transmission of the indication of the timeout, an indication of an abort command related to the MBIM process. Element 415 may be performed, for example, by MBIM handler circuitry 118 and may correspond, for example, to element 250 of FIG. 2. The indication of the abort command may correspond, generally, to the MBIM_ABORT_RADIO_STATE message described above with respect to element 250 of FIG. 2.

Finally, the process may include aborting, at 420 and based on the indication of the abort command, the MBIM process. Element 420 may be performed by one or both of MBIM handler circuitry 118 and modem protocol stack circuitry 121. For example, in some embodiments aborting at 420 the MBIM process may correspond to transmission of the OM_CONTROL_REQ message at 255 which includes the ABORT command. Additionally or alternatively, aborting at 420 the MBIM process may correspond to element 260 wherein the modem protocol stack circuitry 121 aborts the MBIM process as described above.

It will be understood that the processes described above with respect to FIGS. 3 and 4 are intended as examples of processes, and other embodiments may have more or fewer elements. For example, the processes described in FIG. 3 or 4 may include additional elements from FIG. 2, or certain elements may be omitted.

Figure 5:
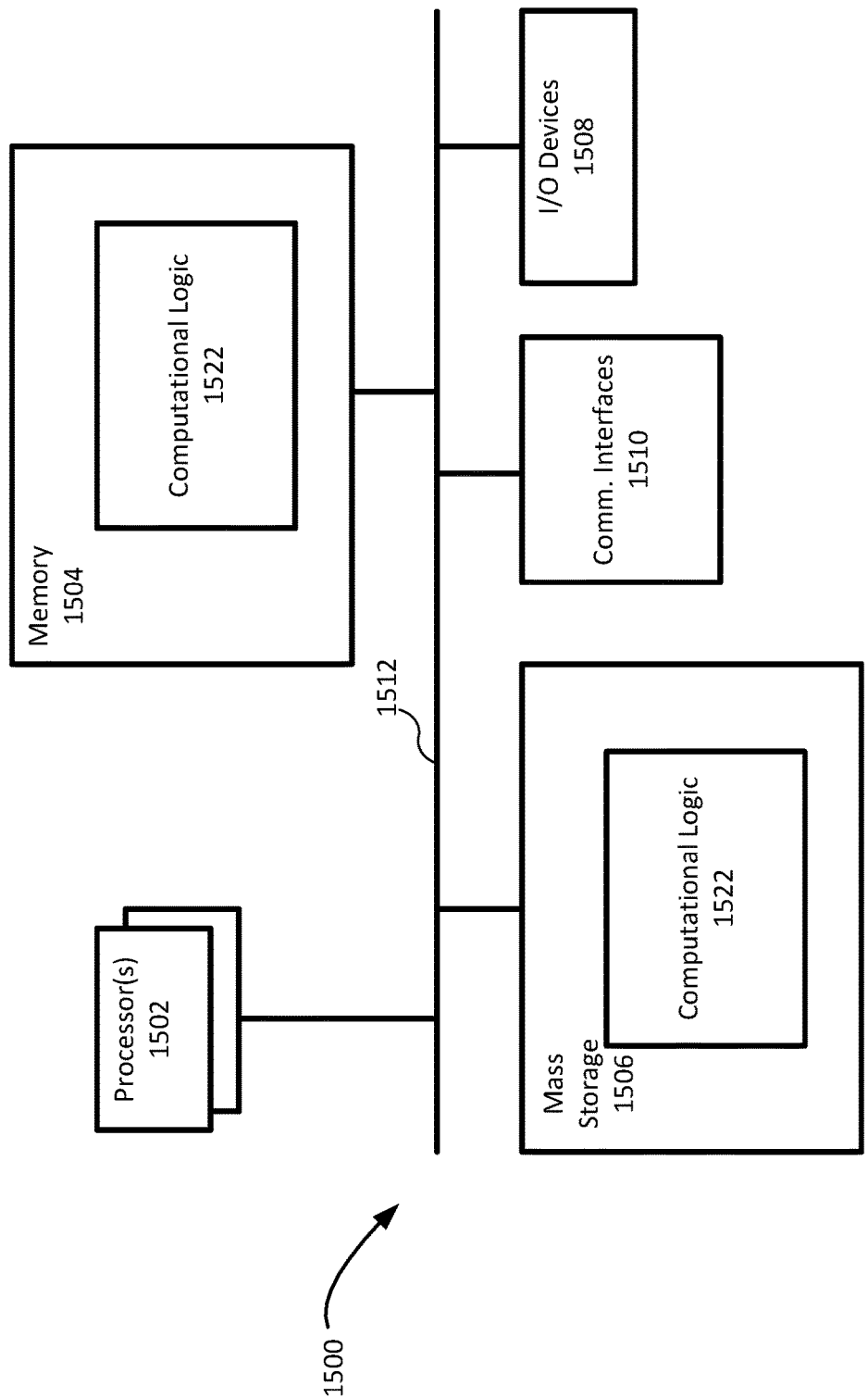
FIG. 5 illustrates an example computing device, in accordance with various embodiments.

FIG. 5 illustrates an example computing device 1500 suitable for use with various components of FIG. 1, such as the host device 103 or the MBIM modem 127, in accordance with various embodiments. Specifically, in some embodiments, the computing device 1500 may be the host device 103 or the MBIM modem 127. Alternatively, the host device 103 or the MBIM modem 127 may be an element of the computing device 1500, for example, implemented as hardware, firmware, software, or some combination thereof.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth). In some embodiments, the host device 103 may be elements of computing device 1500 such as processor(s) 1502, memory 1504, mass storage 1506, etc. The MBIM modem 127 may be, for example, the communication interfaces 1510 (or an element or portion thereof).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of FIG. 2, 3, or 4 (or elements thereof). The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to practice aspects of the techniques of FIG. 2, 3, or 4 or techniques or processes related to elements of FIG. 1. For one embodiment, at least one of processors 1502 may be packaged together with computational logic 1522 configured to practice aspects of optical signal transmission and receipt described herein to form a System in Package (SiP) or a System on Chip (SoC).

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

Example 1 may include a method comprising: identifying, at an application processor, an indication of a timeout related to a mobile broadband interface model (MBIM) process; and transmitting, by the application processor based on the indication of the timeout, an indication of an abort command, wherein the abort command is to provide direction to abort the MBIM process.

Example 2 may include the method of example 1, wherein the indication of the timeout is received from a cellular processor communicatively coupled with the application processor.

Example 3 may include the method of example 2, wherein the cellular processor is communicatively coupled with the application processor via a universal serial bus (USB) link.

Example 4 may include the method of example 1, wherein the MBIM process is an MBIM detach request.

Example 5 may include the method of any of examples 1-4, wherein the timeout is related to an indication of a maximum time period in which the MBIM process may be completed.

Example 6 may include the method of any of examples 1-4, wherein the indication of the timeout is an MBIM_COMMAND_DONE transmission that includes a ResponseTimeout value.

Example 7 may include the method of any of examples 1-4, wherein the indication of the abort command is an MBIM_ABORT_RADIO_STATE transmission.

Example 8 may include a method comprising: identifying, by a cellular processor, that a timer related to a mobile broadband interface model (MBIM) process has expired; transmitting, by the cellular processor based on the identification that the timer has expired, an indication of a timeout; identifying, by the cellular processor based on the transmission of the indication of the timeout, an indication of an abort command related to the MBIM process; and aborting, by the cellular processor based on the indication of the abort command, the MBIM process.

Example 9 may include the method of example 8, wherein the indication of the timeout is transmitted to an application processor communicatively coupled with the cellular processor.

Example 10 may include the method of example 8, wherein the cellular processor is communicatively coupled with an application processor via a universal serial bus (USB) link.

Example 11 may include the method of any of examples 8-10, wherein the timer is related to a received indication of a maximum time period in which the MBIM process may be completed.

Example 12 may include the method of any of examples 8-10, wherein the indication of the timeout is an MBIM_COMMAND_DONE transmission that includes a ResponseTimeout value.

Example 13 may include the method of any of examples 8-10, wherein the indication of the abort command is an MBIM_ABORT_RADIO_STATE transmission.

Example 14 may include an application processor comprising: a host user interface (UI) module; and a wireless wide area network (WWAN) module coupled with the UI module, the WWAN module to: identify an indication of a timeout related to a mobile broadband interface model (MBIM) process; and transmit, based on the indication of the timeout, an indication of an abort command, wherein the abort command is to provide direction to abort the MBIM process.

Example 15 may include the application processor of example 14, wherein the indication of the timeout is received from a cellular processor communicatively coupled with the application processor.

Example 16 may include the application processor of example 15, wherein the cellular processor is communicatively coupled with the application processor via a universal serial bus (USB) link.

Example 17 may include the application processor of example 14, wherein the MBIM process is an MBIM detach request.

Example 18 may include the application processor of any of examples 14-16, wherein the timeout is related to an indication of a maximum time period in which the MBIM process may be completed.

Example 19 may include the application processor of any of examples 14-16, wherein the indication of the timeout is an MBIM_COMMAND_DONE transmission that includes a ResponseTimeout value.

Example 20 may include the application processor of any of examples 14-16, wherein the indication of the abort command is an MBIM_ABORT_RADIO_STATE transmission.

Example 21 may include a cellular processor comprising: a modem protocol stack to communicate with a radio access network (RAN), the modem protocol stack to transmit an indication to the RAN, the indication to initiate a mobile broadband interface model (MBIM) process; and a mobile broadband interface model (MBIM) handler coupled with the modem protocol stack, the MBIM handler to: identify that a timer related to the MBIM process has expired; transmit, based on the identification that the timer has expired, an indication of a timeout; identify, based on the transmission of the indication of the timeout, an indication of an abort command related to the MBIM process; and direct, based on the indication of the abort command, the modem protocol stack to abort the MBIM process.

Example 22 may include the cellular processor of example 21, wherein the MBIM handler is to transmit the indication of the timeout to an application processor communicatively coupled with the cellular processor.

Example 23 may include the cellular processor of example 21, wherein the cellular processor is a baseband processor of a user equipment (UE).

Example 24 may include the cellular processor of any of examples 21-23, wherein the timer is related to a received indication of a maximum time period in which the MBIM process may be completed.

Example 25 may include the cellular processor of any of examples 21-23, wherein the indication of the timeout is an MBIM_COMMAND_DONE transmission that includes a ResponseTimeout value.

Example 26 may include the cellular processor of any of examples 21-23, wherein the indication of the abort command is an MBIM_ABORT_RADIO_STATE transmission.

Example 27 may include an application processor comprising: means to identify an indication of a timeout related to a mobile broadband interface model (MBIM) process; and means to transmit, based on the indication of the timeout, an indication of an abort command, wherein the abort command is to provide direction to abort the MBIM process.

Example 28 may include the application processor of example 27, wherein the indication of the timeout is received from a cellular processor communicatively coupled with the application processor.

Example 29 may include the application processor of example 28, wherein the cellular processor is communicatively coupled with the application processor via a universal serial bus (USB) link.

Example 30 may include the application processor of example 27, wherein the MBIM process is an MBIM detach request.

Example 31 may include the application processor of any of examples 27-30, wherein the timeout is related to an indication of a maximum time period in which the MBIM process may be completed.

Example 32 may include the application processor of any of examples 27-30, wherein the indication of the timeout is an MBIM_COMMAND_DONE transmission that includes a ResponseTimeout value.

Example 33 may include the application processor of any of examples 27-30, wherein the indication of the abort command is an MBIM_ABORT_RADIO_STATE transmission.

Example 34 may include a cellular processor comprising: means to identify that a timer related to a mobile broadband interface model (MBIM) process has expired; means to transmit, based on the identification that the timer has expired, an indication of a timeout; means to identify, based on the transmission of the indication of the timeout, an indication of an abort command related to the MBIM process; and means to abort, based on the indication of the abort command, the MBIM process.

Example 35 may include the cellular processor of example 34, wherein the indication of the timeout is transmitted to an application processor communicatively coupled with the cellular processor.

Example 36 may include the cellular processor of example 34, wherein the cellular processor is communicatively coupled with an application processor via a universal serial bus (USB) link.

Example 37 may include the cellular processor of any of examples 34-36, wherein the timer is related to a received indication of a maximum time period in which the MBIM process may be completed.

Example 38 may include the cellular processor of any of examples 34-36, wherein the indication of the timeout is an MBIM_COMMAND_DONE transmission that includes a ResponseTimeout value.

Example 39 may include the cellular processor of any of examples 34-36, wherein the indication of the abort command is an MBIM_ABORT_RADIO_STATE transmission.

Example 40 may include one or more non-transitory computer-readable media comprising instructions that, when executed by an application processor, cause the application processor to: identify an indication of a timeout related to a mobile broadband interface model (MBIM) process; and transmit, based on the indication of the timeout, an indication of an abort command, wherein the abort command is to provide direction to abort the MBIM process.

Example 41 may include the one or more non-transitory computer-readable media of example 40, wherein the indication of the timeout is received from a cellular processor communicatively coupled with the application processor.

Example 42 may include the one or more non-transitory computer-readable media of example 41, wherein the cellular processor is communicatively coupled with the application processor via a universal serial bus (USB) link.

Example 43 may include the one or more non-transitory computer-readable media of example 40, wherein the MBIM process is an MBIM detach request.

Example 44 may include the one or more non-transitory computer-readable media of any of examples 40-43, wherein the timeout is related to an indication of a maximum time period in which the MBIM process may be completed.

Example 45 may include the one or more non-transitory computer-readable media of any of examples 40-43, wherein the indication of the timeout is an MBIM_COMMAND_DONE transmission that includes a ResponseTimeout value.

Example 46 may include the one or more non-transitory computer-readable media of any of examples 40-43, wherein the indication of the abort command is an MBIM_ABORT_RADIO_STATE transmission.

Example 47 may include one or more non-transitory computer-readable media comprising instructions that, when executed by a cellular processor, cause the cellular processor to: identify that a timer related to a mobile broadband interface model (MBIM) process has expired; transmit, based on the identification that the timer has expired, an indication of a timeout; identify, based on the transmission of the indication of the timeout, an indication of an abort command related to the MBIM process; and abort, based on the indication of the abort command, the MBIM process.

Example 48 may include the one or more non-transitory computer-readable media of example 47, wherein the indication of the timeout is transmitted to an application processor communicatively coupled with the cellular processor.

Example 49 may include the one or more non-transitory computer-readable media of example 47, wherein the cellular processor is communicatively coupled with an application processor via a universal serial bus (USB) link.

Example 50 may include the one or more non-transitory computer-readable media of any of examples 47-49, wherein the timer is related to a received indication of a maximum time period in which the MBIM process may be completed.

Example 51 may include the one or more non-transitory computer-readable media of any of examples 47-49, wherein the indication of the timeout is an MBIM_COMMAND_DONE transmission that includes a ResponseTimeout value.

Example 52 may include the one or more non-transitory computer-readable media of any of examples 47-49, wherein the indication of the abort command is an MBIM_ABORT_RADIO_STATE transmission.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. One or more non-transitory computer-readable media comprising instructions that, when executed by an application processor of a communication device, cause the application processor to:
   receive, from a cellular processor of the communication device, an indication of a timeout related to an incompletion of a mobile broadband interface model (MBIM) process being performed by the cellular processor in response to a request of the application processor; and
   transmit to the cellular processor, based on the indication of the timeout, an indication of an abort command, wherein the abort command is to provide direction to abort and cease performance of the MBIM process previously requested by the application processor.

2. The one or more non-transitory computer-readable media of claim 1, wherein the cellular processor is communicatively coupled with the application processor via a universal serial bus (USB) link, and the request to perform the MBIM process, the indication of the timeout, and the direction to abort are exchanged between the application and cellular processors over the USB link.

3. The one or more non-transitory computer-readable media of claim 1, wherein the MBIM process is an MBIM detach request.

4. The one or more non-transitory computer-readable media of claim 1, wherein the timeout is related to an indication of a maximum time period in which the MBIM process may be completed.

5. The one or more non-transitory computer-readable media of claim 1, wherein the indication of the timeout is an MBIM_COMMAND_DONE transmission that includes a ResponseTimeout value.

6. The one or more non-transitory computer-readable media of claim 1, wherein the indication of the abort command is an MBIM_ABORT_RADIO_STATE transmission.

7. One or more non-transitory computer-readable media comprising instructions that, when executed by a cellular processor of a communication device, cause the cellular processor to:
   identify that a timer related to an incompletion of a mobile broadband interface model (MBIM) process being performed by the cellular processor has expired, the MBIM process being performed by the cellular processor for an application processor of the communication device, in response to a request of the application processor;
   transmit to the application processor, based on the identification that the timer has expired, an indication of a timeout;
   receive, in response to the transmission of the indication of the timeout, from the application processor, an indication of an abort command related to the MBIM process; and abort, based on the indication of the abort command, and cease performance of the MBIM process.

8. The one or more non-transitory computer-readable media of claim 7, wherein the cellular processor is communicatively coupled with an application processor via a universal serial bus (USB) link, and the request to perform the MBIM process, the indication of the timeout, and the direction to abort are exchanged between the application and cellular processors over the USB link.

9. The one or more non-transitory computer-readable media of claim 7, wherein the timer is related to a maximum time period in which the MBIM process may be completed.

10. The one or more non-transitory computer-readable media of claim 7, wherein the indication of the timeout is an MBIM_COMMAND_DONE transmission that includes a ResponseTimeout value.

11. The one or more non-transitory computer-readable media of claim 7, wherein the indication of the abort command is an MBIM_ABORT_RADIO_STATE transmission.

12. An application processor for a communication device, comprising:
- a host user interface (UI) module; and
- a wireless wide area network (WWAN) module coupled with the host UI module, the WWAN module to:
- receive, from a mobile broadband interface model (MBIM) handler of a cellular processor of the communication device, an indication of a timeout related to a MBIM process being performed by the MBIM handler for the WWAN module, in response to a request of the WWAN module; and
- transmit to the MBIM handler, based on the indication of the timeout, an indication of an abort command, wherein the abort command is to provide direction to the MBIM handler to abort and cease performance of the MBIM process.

13. The application processor of claim 12, wherein the cellular processor is communicatively coupled with the application processor via a universal serial bus (USB) link, and the request to perform the MBIM process, the indication of the timeout, and the direction to abort are exchanged between the WWAN module and the MBIM handler over the USB link.

14. The application processor of claim 12, wherein the MBIM process is an MBIM detach request.

15. The application processor of claim 12, wherein the timeout is related to an indication of a maximum time period in which the MBIM process may be completed.

16. The application processor of claim 12, wherein the indication of the timeout is an MBIM_COMMAND_DONE transmission that includes a ResponseTimeout value.

17. The application processor of claim 12, wherein the indication of the abort command is an MBIM_ABORT_RADIO_STATE transmission.

18. A cellular processor for a communication device, comprising:
- a modem protocol stack to communicate with a radio access network (RAN), the modem protocol stack to transmit an indication to the RAN, the indication to initiate a mobile broadband interface model (MBIM) process on behalf of a MBIM handler; and
- the MBIM handler coupled with the modem protocol stack, the MBIM handler and arranged to:
- request the modem protocol stack to initiate the MBIM process in response to a request of the MBIM process from a wireless wide area network (WWAN) module of an application processor of the communication device;
- identify that a timer related to a completion of the MBIM process has expired;
- transmit to the WWAN module, based on the identification that the timer has expired, an indication of a timeout;
- receive, in response to the transmission of the indication of the timeout, from the WWAN module, an indication of an abort command related to the MBIM process; and
- direct, based on the indication of the abort command, the modem protocol stack to abort and cease performance of the MBIM process.

19. The cellular processor of claim 18, wherein the cellular processor is a baseband processor, and the communication device is a user equipment (UE).

20. The cellular processor of claim 18, wherein the timer is related to a maximum time period in which the MBIM process may be completed.

21. The cellular processor of claim 18, wherein the indication of the timeout is an MBIM_COMMAND_DONE transmission that includes a ResponseTimeout value.

22. The cellular processor of claim 18, wherein the indication of the abort command is an MBIM_ABORT_RADIO_STATE transmission.

* * * * *